United States Patent
Kraemer et al.

(10) Patent No.: US 10,167,794 B2
(45) Date of Patent: Jan. 1, 2019

(54) METHOD AND SYSTEM FOR CONTROLLING AN INTERNAL COMBUSTION ENGINE AND/OR AN EXHAUST AFTER TREATMENT DEVICE OF A VEHICLE, VEHICLE WITH SUCH A SYSTEM, AS WELL AS COMPUTER PROGRAM PRODUCT FOR CARRYING OUT SUCH A METHOD AND CONTROL UNIT WITH SUCH A COMPUTER PROGRAM PRODUCT

(71) Applicant: GM GLOBAL TECHNOLOGY OPERATIONS LLC, Detroit, MI (US)

(72) Inventors: Felix Kraemer, Ruesselsheim (DE); Nihad Karacic, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/422,637

(22) Filed: Feb. 2, 2017

(65) Prior Publication Data

US 2017/0226946 A1    Aug. 10, 2017

(30) Foreign Application Priority Data

Feb. 6, 2016  (DE) .......................... 10 2016 001 367

(51) Int. Cl.
*B60T 7/12*   (2006.01)
*F02D 41/02*  (2006.01)
(Continued)

(52) U.S. Cl.
CPC ..... *F02D 41/0235* (2013.01); *F02D 13/0261* (2013.01); *F02D 41/146* (2013.01);
(Continued)

(58) Field of Classification Search
CPC ............ F02D 35/0015; F02D 41/0047; F02D 41/005; F02D 41/0052; F02D 41/0062; F02D 41/0055
(Continued)

(56) References Cited

U.S. PATENT DOCUMENTS 6,154,701 A  *  11/2000  Loffler .................. B60W 10/06
                                                        477/110
2005/0173523 A1*  8/2005  Yushio ..................... F01N 11/00
                                                        235/384
(Continued)

FOREIGN PATENT DOCUMENTS

AT        008645 D1      10/2006
AT          008645 U1    10/2006
(Continued)

OTHER PUBLICATIONS

German Patent Office, German Search Report for German Patent Application No. 10 2016 001 367.2 dated Sep. 9, 2016.

*Primary Examiner* — John Kwon
(74) *Attorney, Agent, or Firm* — Lorenz & Kopf, LLP (57) ABSTRACT

A method and systems are disclosed for controlling the exhaust emissions an internal combustion engine of a vehicle. The driving state of the vehicle is determined and corresponding driving state signals are generated with the aid of driving state detectors. The emission values of the exhaust gases emitted by the internal combustion engine are determined based on the driving state signals by a computer model stored in a control unit. The determined emission values are compared with predefined emission limits by the control unit. If the determined emission values exceed the predefined emission limits, the internal combustion engine and/or the exhaust aftertreatment device are controlled by (Continued)

the control unit such that the determined emission values are reduced until they lie below the predefined emission limits.

12 Claims, 2 Drawing Sheets

(51) Int. Cl.
    *F02D 13/02*     (2006.01)
    *F02D 41/14*     (2006.01)
    *F02D 41/26*     (2006.01)

(52) U.S. Cl.
    CPC ..... *F02D 41/1452* (2013.01); *F02D 41/1454* (2013.01); *F02D 41/26* (2013.01); F02D 2200/10 (2013.01); F02D 2200/501 (2013.01)

(58) Field of Classification Search
    USPC .................................. 701/108–110, 114, 115
    See application file for complete search history.

(56) References Cited

U.S. PATENT DOCUMENTS

| | | | |
|---|---|---|---|
| 2009/0042152 A1* | 2/2009 | Tanaka | F23N 1/022 |
| | | | 431/12 |
| 2009/0064970 A1* | 3/2009 | Porten | F02M 25/06 |
| | | | 123/406.19 |
| 2012/0173121 A1* | 7/2012 | Willard | F02D 41/0235 |
| | | | 701/102 |
| 2013/0131967 A1 | 5/2013 | Yu et al. | |
| 2016/0221566 A1* | 8/2016 | Lachenmaier | B60W 20/00 |

FOREIGN PATENT DOCUMENTS

| | | |
|---|---|---|
| DE | 102012001477 A1 | 8/2013 |
| DE | 102013110786 A1 | 12/2014 |

* cited by examiner

Fig.3

METHOD AND SYSTEM FOR CONTROLLING AN INTERNAL COMBUSTION ENGINE AND/OR AN EXHAUST AFTER TREATMENT DEVICE OF A VEHICLE, VEHICLE WITH SUCH A SYSTEM, AS WELL AS COMPUTER PROGRAM PRODUCT FOR CARRYING OUT SUCH A METHOD AND CONTROL UNIT WITH SUCH A COMPUTER PROGRAM PRODUCT

CROSS-REFERENCE TO RELATED APPLICATION

This application claims priority to German Patent Application No. 102016001367.2, filed Feb. 6, 2016, which is incorporated herein by reference in its entirety.

TECHNICAL FIELD

The present disclosure pertains to a method and a system for controlling an internal combustion engine and/or an exhaust aftertreatment device of a vehicle, a vehicle with such a system, as well as a computer program product for carrying out such a method and a control unit with such a computer program product.

BACKGROUND

In order to obtain an official approval, internal combustion engines, particularly spark ignition engines and diesel engines, have to comply with certain emission standards or emission laws such as, for example, regulation (EC) 692/2008. Standards associated with regulations such as this specify certain emission limits, in particular, for carbon monoxide (CO), nitrogen oxides ($NO_x$), hydrocarbons (HC), particle mass (PM) and particle number (PN) for the particular jurisdiction such as member states of the European Union. In addition to the emission limits, the emission standards typically specify the test conditions under which the emission characteristics of the respective internal combustion engine have to be analyzed. Depending on the particular standard that applies to an internal combustion engine to be analyzed, static or dynamic driving states are analyzed on a roller-type dynamometer. For example, certain speed and acceleration profiles are driven and it is subsequently checked whether or not the emission values of the exhaust gases emitted by the analyzed internal combustion engine exceed the legally specified emission limits.

The dynamic test conditions, in particular, are intended to simulate the driving states occurring in the normal driving mode in order to analyze whether or not the internal combustion engine also complies with the emission limits in the normal driving mode. In order to ensure the reproducibility of the test results, the various standards specify the test conditions, under which the internal combustion engine has to be analyzed, in a relatively precise fashion. The currently valid test cycle for Europe is the NEDC (New European Driving Cycle), which specifies the test conditions to be analyzed. As a result, the engine manufacturers design the internal combustion engines in such a way that they comply with the emission limits in accordance with the NEDC. Although the NEDC also contains dynamic test conditions, the test conditions are known. It is particularly known, at which operating points the internal combustion engine is tested and how long and how often the internal combustion engine is at these operating points. In the NEDC, operating points in the lower part-load range of the internal combustion engine are also analyzed. Consequently, the NEDC and similar test cycles only simulate the normal driving mode of the internal combustion engine roughly at best such that internal combustion engines, which comply with the applicable European standards, sometimes significantly exceed the specified emission limits in the normal driving mode.

In order to minimize the variations between the emission characteristics of the respective internal combustion engine under test conditions and in the normal driving mode, the emission characteristics of internal combustion engines will in the future no longer or no longer only be analyzed on a roller-type dynamometer and in accordance with the NEDC, but rather on a conventional road-test route such that it can be subsequently determined if the emission values also comply with the emission limits under normal driving conditions. Such test methods are also referred to as RDE ("Real Driving Emissions") methods, in which the internal combustion engine is not analyzed on the dynamometer, but rather in normal road traffic without prior knowledge of the road-test route to be used. The vehicle being analyzed carries along a corresponding emission analyzer (PEMS, portable emission measurement system). It is therefore also not known, at which operating points and under which ambient conditions such as, for example, the incline of the route traveled and the current weather conditions (e.g. wind and external temperature) the internal combustion engine is analyzed.

In order to also comply with the corresponding emission standards when the RDE test method is used, the internal combustion engine can be designed in such a way that it also complies with the emission limits under the most unfavorable boundary conditions ("worst-case scenario") that can occur in the normal driving mode. An example of such unfavorable boundary conditions may be an acceleration maneuver on an incline in a headwind. In order to also comply with the emission limits under these boundary conditions, for example, the maximum power output of the internal combustion engine can be correspondingly limited in the first place. These and similar countermeasures, which are based on the "worst case scenario," are also referred to as static calibrations and cannot be changed in the driving mode. In this context, it is disadvantageous, for example, that the power reserves of the internal combustion engine cannot be fully utilized although the "worst-case scenario" is an extremely rare occurrence and the internal combustion engine would not exceed the emission limits under more "mild" boundary conditions. Due to these static calibrations, the design of the internal combustion engine has to be permanently based on unfavorable boundary conditions that only occur very rarely.

SUMMARY

The present disclosure provides a method and a system for controlling an internal combustion engine and/or an exhaust aftertreatment device, by which the internal combustion engine and/or an exhaust aftertreatment device can be operated with minimal countermeasures such that it complies with the emission limits in the normal driving mode, namely also in driving states that approach the "worst-case scenario." In another embodiment, the present disclosure provides a computer program with a program code for carrying out such a method. Yet another embodiment of the present disclosure, a vehicle is provided with such a system. An implementation of the present disclosure is furthermore based on developing a control unit with such a computer program product.

In particular, the present disclosure provides a method for controlling an internal combustion engine and/or an exhaust aftertreatment device of a vehicle in which the driving state of the vehicle is determined and corresponding driving state signals are generated with the aid of driving state detectors. The emission values of the exhaust gases emitted from the internal combustion engine are determined based on the driving state signals by a computer model stored in a control unit. The determined emission values are compared with predefined emission limits by the control unit. If the determined emission values exceed the predefined emission limits, the internal combustion engine and/or the exhaust aftertreatment device is controlled by the control unit such that the determined emission values are reduced until they lie below the predefined emission limits.

In this context, the term predefined emission limits particularly refers to emission limits that have to be taken into account during the course of an approval of an internal combustion engine. Such boundary conditions and emission limits are particularly enacted by state institutions, but do not necessarily have to be anchored in laws and may also be specified in the form of standards, guidelines, regulations or suggestions, which may likewise originate from institutions and manufacturers in the private sector.

Conventionally, it is not possible to continuously determine the emission values of the exhaust gases emitted by the internal combustion engine of production vehicles while driving because the available sensors cannot quantify all exhaust gas components contained in the exhaust gas. The present disclosure therefore proposes to utilize a computer model that determines the emission values of the emitted exhaust gases based on data on the respectively determined driving state, which is available in production vehicles. The driving state can be determined, for example, based on the speed, the acceleration, the driving time and/or the power output. Corresponding driving state detectors are available in any modern production vehicle. The driving state detectors may include correspondingly designed sensors, but they may also include additional computer models. For example, the additional computer model can calculate the power output based on the current speed and the current torque by using corresponding characteristic diagrams of the internal combustion engine, which may be stored in the control unit. The information generated by the driving state detectors is fed to the computer model. The computer model determines the emission values of the emitted exhaust gases from the determined driving state. After the control unit has compared the determined emission values with the predefined emission limits, it is checked if the determined emission values lie above the predefined emission limits. If this is the case, countermeasures are taken in order to reduce the determined emission values below the predefined emission limits. To this end, the control unit controls the internal combustion engine and/or the exhaust aftertreatment device in such a way that the determined emission values lie below the predefined emission limits.

In this embodiment of the present disclosure, the control unit only initiates countermeasures acting upon the internal combustion engine and/or the exhaust aftertreatment device if the emission values of the emitted exhaust gases, which were determined based on the computer model, lie above the predefined emission limits. Otherwise, no countermeasures are taken.

In order to reduce the emission values of the emitted exhaust gases, most countermeasures reduce the power output of the internal combustion engine. Due to the conventional static calibrations, the internal combustion engine can only output part of its power and never its full power. As a result, the internal combustion engine cannot fully utilize its power reserves and, for example, therefore has inferior response characteristics or the vehicle can only be operated with a reduced top speed. If it is intended to utilize the full power potential available without the static calibration and to nevertheless comply with the predefined emission limits, the internal combustion engine has to be designed for a higher power output and therefore requires additional constructive effort, which leads to increased manufacturing costs and usually a higher fuel consumption.

The computer model can continuously determine the current emission values of the exhaust gas emitted by the internal combustion engine with sufficient accuracy in real time based on the current driving state. It is therefore possible to realize dynamic calibrations that can be carried out while driving. The countermeasures are only taken when they are actually required for reducing the emission values of the emitted exhaust gases to or below the predefined emission limits. The design of the internal combustion engine therefore does not have to be based on the "worst-case scenario" such that particularly the power reserves of the internal combustion engine can be fully utilized in most driving states without exceeding the predefined emission limits. Furthermore, the dynamics, the NVH (noise, vibration, harshness) that particularly describes the acoustics and the smoothness of running, the fuel consumption and the urea consumption of diesel engines can be implemented in the desired fashion in most driving states. Countermeasures that negatively affect the one or more of these factors are reduced to a minimum. No constructive measures for increasing the power are required such that the manufacturing costs are not increased.

The countermeasures taken when the internal combustion engine is controlled in order to reduce the emission values of the emitted exhaust gases are internal engine countermeasures. External engine countermeasures are taken when the exhaust aftertreatment device is controlled such that the emission values are reduced. In diesel engines, such an external engine countermeasure may include an increased urea injection into an SCR ("selective catalytic reduction") catalytic converter of the exhaust aftertreatment device. Most internal engine countermeasures lead to a power reduction whereas external engine countermeasures and, in particular, the corresponding control of the exhaust aftertreatment device only have a negligible effect or no effect at all on the power output of the internal combustion engine.

In an alternative embodiment, the determined emission values can be averaged over a predefined period of time. In this case, an average value of the determined emission values over a predefined period of time is calculated, for example, by the control unit. The averaging of the determined emission values serves for reducing the effect of briefly occurring runaway values. These runaway values may occur, for example, during the initially described "worst-case scenario," in which the vehicle is accelerated on an incline in a headwind. Runaway values can also occur after the internal combustion engine has been started, but not yet reached its operating temperature. Without this averaging, countermeasures are immediately initiated once the control unit detects that the determined emission values exceed the predefined emission limits. However, the above-described driving states usually only last for a brief period of time. In most instances, they are preceded and/or followed by driving states, in which the determined emission values clearly lie below the predefined emission limits. Depending on the respective standard, however, the emission limits can only be exceeded by average values such that brief violations are acceptable as long as they are compensated by driving states, in which the emission values of the emitted exhaust gases lie below the emission limits. The averaging therefore makes it possible to utilize the predefined emission limits to the greatest extent possible such that the number of countermeasures and, in particular, power-reducing countermeasures can be reduced to a minimum. The power reserves of the internal combustion engine can be extensively utilized. The driver practically does not perceive the power-reducing countermeasures because they are only rarely initiated.

In another embodiment, the driving time, the speed of the vehicle, the acceleration of the vehicle, the power output of the internal combustion engine, the $CO_2$ emission and/or the $NO_x$ emission of the internal combustion engine can be taken into account in the determination of the driving state. In modern vehicles, the speed and the acceleration of the vehicle are continuously measured anyway and used, for example, by stability control systems that stabilize the vehicle. The $NO_x$ emission can be determined by a $NO_x$ sensor of the type usually provided, in particular, in production vehicles with diesel engines.

For example, other parameters that may be taken into account in the determination of the driving state are the distance traveled from the start during the driving time, the temperature of the cooling water, the ambient temperature and the ambient pressure. Other parameters, which are not mentioned in this context, may also be taken into account. It is attempted to initially utilize all parameters that are measured in the respective vehicle anyway as long as they provide a purposeful contribution to the determination of the driving state. Parameters that can only be measured with additional constructive effort or additional hardware and, in particular, with additional sensors are taken into account in a subordinated fashion because they are associated with additional costs. However, their use may nevertheless be considered if the additional hardware or an additional sensor is particularly beneficial.

In case no sensor is available for a certain exhaust gas component, the current emission of this exhaust gas component can be indirectly determined by using an additional computer model. For example, the current $CO_2$ emission can be determined with sufficient accuracy based on the fuel quantity injected by the fuel pump and the air-fuel ratio k, wherein the additional computer model carries out a simple conversion to this end.

In order to determine the power output of the internal combustion engine, the additional computer model may feature a characteristic diagram that was prepared during the engine development of the respective internal combustion engine. The additional computer model can deduce the current power output based on the signals delivered by the tachometer. The current power output may alternatively or cumulatively also be determined by a torque sensor without requiring the additional computer model for this determination.

The more parameters are taken into account in the determination of the driving state, the better the computer model can determine the emission values of the emitted exhaust gases. In this context, it is attempted to take into account the parameters, which either are already determined anyway or can be determined from existing data with the aid of the additional computer model. Consequently, no additional hardware components and, in particular, no additional sensors are needed for implementing the present disclosure such that no additional constructive measures are required. However, this does not rule out the possibility of also taking into account data delivered by additional sensors or other hardware components, which are currently not available or cannot be installed into the vehicle, in the computer model as long as they contribute to determining the emission values of the emitted exhaust gases in a more precise fashion. At this point, it should therefore be noted that the aforementioned parameters, which are taken into account in the determination of the driving state, are not conclusive, but rather can be supplemented with any other parameters In another embodiment, the control unit can control the internal combustion engine in such a way that the air-fuel ratio ($\lambda$) of the air-fuel mixture fed to the internal combustion engine is varied. The internal combustion engine is usually operated with an air-fuel ratio ($\lambda$) of 1. A slight increase of $\lambda$ in the high-load range of the engine leads to lower CO and PN emissions. However, the power output of the internal combustion engine has to be reduced in this case in order to protect the corresponding components and, in particular, the turbocharger from an excessively high thermal load, i.e. an increase of the air-fuel ratio ($\lambda$) is associated with a power-reducing countermeasure for reducing the emission values of the emitted exhaust gas.

In an embodiment the control unit controls the internal combustion engine in such a way that the overlapping periods of the intake valve and the exhaust valve of the internal combustion engine are varied. The intake valve and the exhaust valve are simultaneously open in these overlapping periods. In addition to adjustable intake and exhaust camshafts, which are standard equipment in modern internal combustion engines, a direct fuel injection is required in this case. Conventional PFI (port-fuel-injection) engines with intake manifold fuel injection are only conditionally suitable for simultaneously opening the intake and exhaust valves. This type of control of the intake and exhaust valves is also referred to as "scavenging." The simultaneous opening of the intake and exhaust valves, which is controlled by two cam phase converters, causes a direct overflow of a certain proportion of the combustion air into the exhaust duct. The combustion air mixes with the exhaust gases in a specially shaped exhaust manifold. The components of the exhaust gases after burn exothermally due to the supplied oxygen. The exothermal afterburning of the exhaust gas caused by the extended overlapping periods reduces the exhaust gas emissions contained therein. If the internal combustion engine is charged by a turbocharger, its compressive power increases because the exhaust gas turbine is acted upon with an increased volumetric flow of exhaust gas. Consequently, "scavenging" is particularly used at low speeds, at which the turbocharger only makes available a low compressive power, in order to improve the response characteristics during acceleration maneuvers because high power is required for such acceleration maneuvers. Shortening the overlapping period leads to a reduced power output and therefore to a deterioration of the response characteristics. However, the $NO_x$ and PN emissions are lowered with these measures.

In addition to the overlapping periods of the intake and exhaust valves, another parameter that can be varied as part of the scavenging process is the maximum overall time, in which the internal combustion is operated in the scavenging mode. The overlapping periods only amount to a few milliseconds, but the overall time may lie, for example, between 1 and 10 seconds. In addition, the air-fuel mixture can be varied in the scavenging mode. Furthermore, the period of time, within which the maximum overlapping time is reached, can be chosen shorter or longer ("ramp in").

According to another embodiment, the volume of combustion air fed to the internal combustion engine can be varied with at least one control valve, particularly a throttle valve. The control unit controls the at least one control valve in such a way that the emission values are reduced. In addition to the throttle valve, the waste gate arranged in a bypass of the exhaust tract, which bypasses the exhaust gas turbine, may also be used as control valve. The exhaust gas turbine of the turbocharger is acted upon with a higher or lower exhaust gas flow depending on how far the waste gate is opened such that the turbocompressor rotates faster or slower. The combustion air is accordingly compressed to a greater or lesser extent such that a larger or smaller volume of combustion air is fed to the internal combustion engine. The variation of the volume of combustion air fed to the internal combustion engine respectively causes a change of the power output or of the load, with which the internal combustion engine is operated. The more combustion air is fed to the internal combustion engine, the higher its power output. However, the emissions contained in the exhaust gas also increase because a higher power output is inevitably associated with an increased fuel consumption. Conversely, this means that an actuation of the control valves causes a reduction of the emissions being emitted. Modern vehicles feature an air mass flow sensor such that the volume of the combustion air fed to the internal combustion engine can be easily controlled.

At this point, it should be noted that there is a large number of parameters that can be varied by the control unit and make it possible to control the internal combustion engine in such a way that the emission values of the exhaust gases emitted by the internal combustion engine can be reduced. The above-described countermeasures represent a sample of the parameter selection. Each exhaust gas component is usually considered individually and the emissions of the respective exhaust gas component are reduced by taking a number of countermeasures assigned to this exhaust gas component. The extensive countermeasures can be initiated in a staggered and proactive fashion such that the countermeasures are already taken once it can be ascertained that the determined emission values will soon exceed the emission limits if the driving state persists. In this case, the countermeasures may initially be taken to a small extent such that the driver only perceives the countermeasures very slightly or not at all. The countermeasure with the least effect on the driving state may initially be selected from the plurality of available countermeasures. For example, it would be possible to initially take the above-described external engine countermeasure, in which additional urea is injected into the exhaust aftertreatment device. The next countermeasure is initiated once the selected countermeasure is fully exhausted. Although each countermeasure is assigned to an exhaust gas component, it cannot be ruled out that a countermeasure also reduces the emission value of another exhaust gas component such that this countermeasure can be taken without hesitation. However, there are also countermeasures that reduce the emission value of one exhaust gas component, but increase the emission value of another exhaust gas component. These measures can only be taken if the emission value of the other exhaust gas component lies sufficiently far below the emission limit. Consequently, countermeasures that reduce the emission values of one exhaust gas component and increase the emission values of another exhaust gas component cannot be taken without taking into account the other exhaust gas component.

In another embodiment, the current position of the vehicle is taken into account in the determination of the driving state of the vehicle. The current position is intended to provide information on whether the vehicle is located in a region within a city or outside the city. This information can be obtained, for example, with the GPS signal used by navigation systems or by the speed profile. If the speed of the vehicle has not increased above 60 km/h for a certain period of time, it can be assumed that the vehicle is located in a region within a city. Other indicators for this may be frequent acceleration and deceleration maneuvers, as well as stops. Due to the higher traffic density and the inferior circulation of air caused by the construction of buildings, the emission values, for example, of $NO_x$, CO, HC, as well as the particle number and the particle mass of the air, increase more significantly and frequently in regions within a city than in regions outside a city. This is the reason why a few cities have established so-called environmental zones that can only be used by vehicles having an internal combustion engine which only emits exhaust gases with low emission values. If the computer model receives the information that the vehicle is located in a region within a city, the control unit can control the internal combustion engine in such a way that the emission values considerably fall short of the emission limits in order to minimize air pollution. In case the use of an environmental zone in a certain city is dependent on the respective vehicle not exceeding particularly low emission limits, this aspect can be taken into account in the computer model.

It was already mentioned above that it is tolerable to briefly exceed the emission limits if the determined emission values clearly lie below the predefined emission limits in driving states prior or subsequent to exceeding the emission limits. In this context, it should be noted that it is only tolerable to briefly exceed the emission limits, for example during acceleration maneuvers or when the internal combustion engine has not yet reached its operating temperature. If the current position of the vehicle is taken into account, however, it is possible to prevent prolonged exceeding of the emission limits in a region within a city from being compensated by subsequently driving in a region outside the city.

In another embodiment of the method, the emission limits correspond to those specified in EU regulation (EC) 692/2008. This regulation is binding for all vehicles registered in Europe such that this regulation specifies the applicable emission limits. In case regulations are enacted that supplement, replace or are associated with EU regulation (EC) 692/2008, the emission limits correspond to those of the applicable regulation. However, the limiting values of other regulations may also be stored in the control unit and taken into account in the computer model. For example, stricter limiting values can be applied by the computer model if it is determined that the vehicle is located in an environmental zone based on the GPS signal.

An embodiment of the present disclosure concerns a system for controlling an internal combustion engine and/or an exhaust aftertreatment device, particularly for carrying out the method described above. The system includes driving state detectors for determining the driving state of the vehicle and for generating corresponding driving state signals, and a control unit, in which a computer model for determining the emission values of the exhaust gases emitted by the internal combustion engine based on the driving state signals is stored. The control unit is configured in such a way that the determined emission values of the emitted exhaust gases can be compared with predefined emission limits for these boundary conditions by the control unit and, if the determined emission values exceed the predefined emission limits, the internal combustion engine and/or the exhaust aftertreatment device can be controlled in such a way that the determined emission values are reduced until they lie below the predefined emission limits.

The technical effects and advantages, which can be realized with the proposed system, correspond to those described above with reference to the different embodiments of the method. In summary, it should be noted that dynamic calibrations, which are carried out while driving, can be realized in this embodiment of the system. The countermeasures, which usually reduce the power of the internal combustion engine or increase the consumption of the exhaust aftertreatment device, are only initiated if they are actually required for reducing the emission values of the emitted exhaust gases to or below the predefined emission limits. The dynamic calibrations are based on the computer model that makes it possible to continuously determine the emission values of the exhaust gases emitted by the internal combustion engine while driving from the driving state in real time. The configuration of the internal combustion engine therefore does not have to be based on the "worst-case scenario" such that the power reserves of the internal combustion engine can be used in most driving states without exceeding the predefined emission limits. No constructive measures for increasing the power are required such that the manufacturing costs are not increased.

An embodiment of the present disclosure concerns a computer program product with a program code that is stored on a non-transitory machine-readable medium and serves for carrying out the method according to one of the above-described embodiments. The technical effects and advantages, which can be realized with the proposed computer program product, correspond to those described above with reference to the different embodiments of the method.

An implementation of the present disclosure concerns a vehicle with a system according to the above-described design. The technical effects and advantages, which can be implemented with the proposed vehicle, correspond to those described above with reference to the different embodiments of the method.

A realization of the present disclosure concerns a control unit with a computer program product according to the above-described embodiment. The technical effects and advantages, which can be implemented with the proposed control unit, correspond to those described above with reference to the different embodiments of the method.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
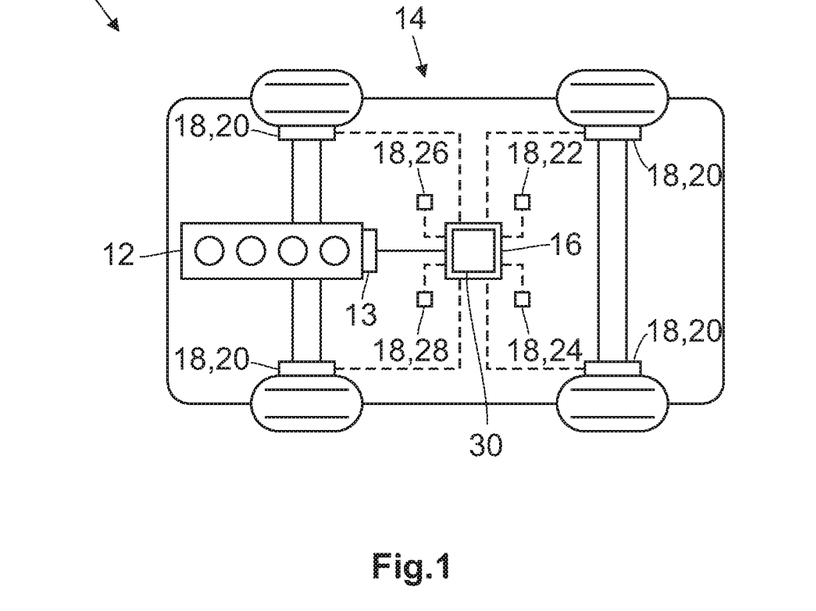
FIG. 1 shows a basic representation of a vehicle with an internal combustion engine that is controlled with the proposed method.

FIG. 1 shows a basic representation of a vehicle 10 with an internal combustion engine 12 and an exhaust aftertreatment device 13 that can be controlled with a method described in greater detail below. In order to control the internal combustion engine 12 and/or the exhaust aftertreatment device 13, the vehicle 10 includes a system 14 having a control unit 16. The control unit 16 cooperates with a plurality of driving state detectors 18, which determine different parameters that characterize the current driving state and convert these parameters into corresponding driving state signals. In the example shown, the driving state detectors 18 include speed sensors 20 that detect the current speed of the vehicle 10. The driving state detectors 18 also include an acceleration sensor 22, by which the current acceleration of the vehicle 10 can be determined. In addition, the driving state detectors 18 include a $NO_x$ sensor 24, by which the current emission values of different nitrogen oxides emitted by the internal combustion engine 12 can be determined. The driving state detectors 18 furthermore include a tachometer 26 for determining the current speed of the internal combustion engine 12, as well as a fuel quantity measuring device 28 for determining the fuel quantity injected into the combustion chamber of the internal combustion engine 12 by a not-shown fuel pump.

A computer model 30, which processes the signals generated by the driving state detectors 18 as described below and controls the internal combustion engine 12 and/or the exhaust aftertreatment device 13 accordingly, is stored in the control unit 16.

Figure 2:
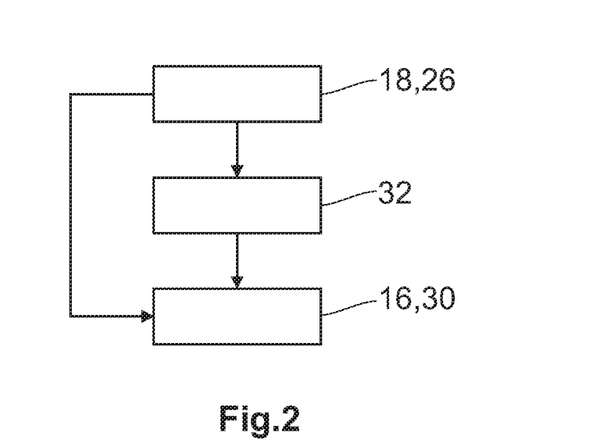
FIG. 2 shows a schematic representation of the proposed determination of the driving state.

FIG. 2 shows a schematic representation of the proposed determination of the driving state. As already mentioned above, the driving state may be characterized by a number of parameters that are determined by the driving state detectors 18. For example, the speed and acceleration sensors 20, 22 directly determine the current value of the corresponding parameter and to feed this parameter to the control unit 16. There are also parameters that in fact describe the driving state, but cannot be directly evaluated by the computer model 30. For example, one interesting parameter is the current power output of the internal combustion engine 12, which cannot be directly derived from the engine speed. The engine speed determined by the tachometer 26 therefore is initially fed to an additional computer model 32, in which a characteristic diagram specific to the respective internal combustion engine is stored. The power output can be deduced from this characteristic diagram based on the current engine speed and other parameters such as, for example, the volume of air fed to the internal combustion engine and the output torque. The additional computer model 32 may either form part of the driving state detectors 18 or part of the computer model 30.

Figure 3:
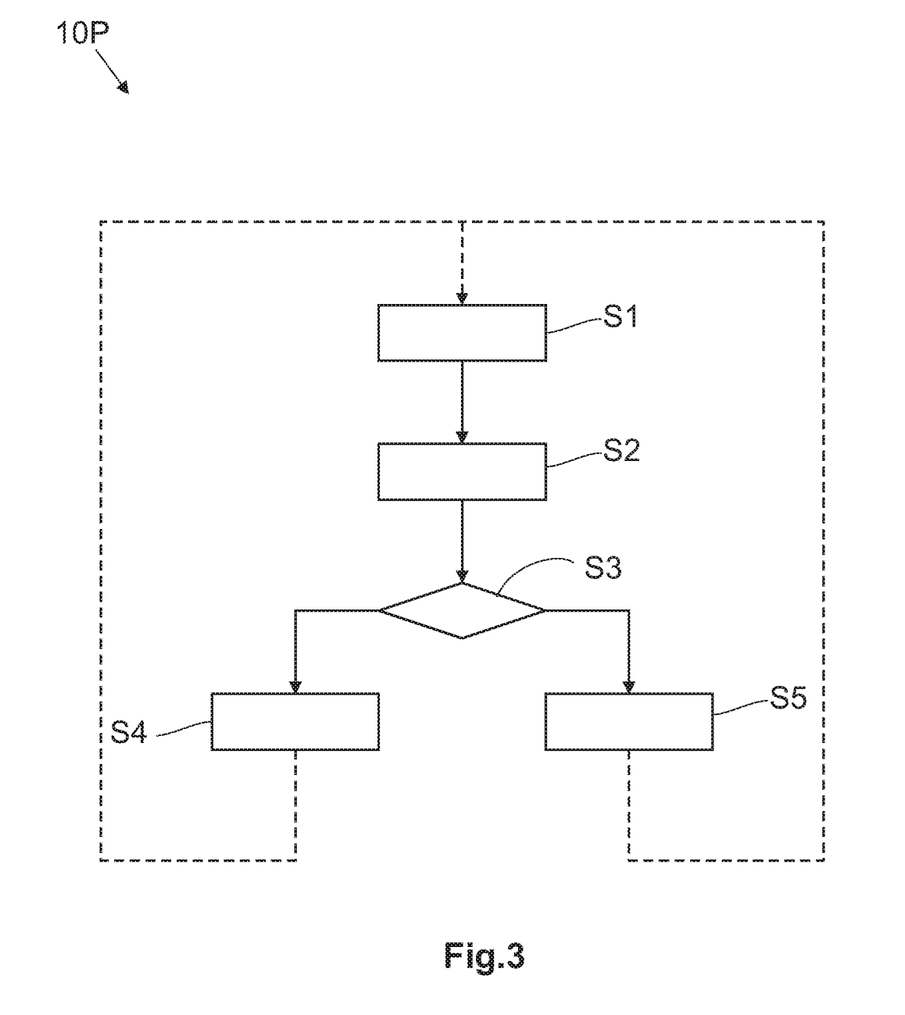
FIG. 3 shows a flowchart of the proposed method.

FIG. 3 shows an embodiment of the proposed method for controlling the internal combustion engine 12 in the form of a flowchart. In a first step S1, the current driving state of the vehicle 10 is determined in the above-described fashion with the aid of the driving state detectors 18. The emission values of the exhaust gases currently emitted by the internal combustion engine 12 are derived from the determined driving state in a step S2. In a subsequent step S3, it is checked if the determined emission values lie above or below predefined emission limits. The emission limits may be specified, for example, in legal regulations. If the determined emission values lie below the emission limits, the internal combustion engine 12 is operated in unchanged form such that the control unit 16 does not intervene in the operation of the internal combustion engine 12 (S4). If the determined emission values lie above the emission limits, the control unit 16 controls the internal combustion engine 12 in such a way that the subsequently determined emission values lie below the predefined emission limits (S5). To this end, steps S1 to S3 are continuously repeated and countermeasures are either initiated or not depending on the result of the comparison. In this case, the control unit 16 can select the most effective countermeasure for reducing the emission values in the determined driving state from a plurality of available countermeasures.

The control unit 16 may assume control of the internal combustion engine 12 when it can be ascertained that the emission values of the exhaust gases emitted by the internal combustion engine 12 will soon exceed the emission limits. To this end, a preliminary emission limit may be specified and the internal combustion engine 12 can be controlled such that emissions are reduced once this preliminary emission limit is exceeded in order to prevent the emission limit from being exceeded or to minimize the period of time, during which the emission limit is exceeded. It can also be taken into account that certain countermeasures only become effective after a certain delay time.

The above-described steps also apply analogously to the control of the exhaust aftertreatment device 13. It was already mentioned above that the control of the exhaust aftertreatment device 13 has no or practically no power-reducing effects on the internal combustion engine 12. The exhaust aftertreatment device 13 therefore can initially be advantageously controlled such that the emission values of the emitted exhaust gases are reduced. The internal engine countermeasures may only be initiated once the control of the exhaust aftertreatment device 13 has been exhausted.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for controlling at least one of an internal combustion engine and an exhaust gas aftertreatment device of a vehicle comprising:
    assigning at least one countermeasure to each of a plurality of exhaust gas components emitted by the internal combustion engine, each countermeasure controlling at least one of the internal combustion engine and the exhaust gas aftertreatment device;
    determining a driving state of the vehicle using at least one driving state detector;
    generating driving state signals based on the determined driving state;
    determining an emission value of each of a plurality of exhaust gas components emitted by the internal combustion engine based on the driving state signals and a computer model stored in a control unit;
    comparing each of the determined emission values to a predefined emission limit for the corresponding one of the plurality of exhaust gas components with the control unit; and
    activating, by the control unit, at least one countermeasure assigned to a respective exhaust gas component when the determined emission values exceed the predefined emission limits for the respective exhaust gas component such that the determined emission values are reduced until they lie below the predefined emission limits, wherein when more than one of the plurality of exhaust gas components exceed their respective predefined emission limits, the control unit is further configured to stagger the countermeasures by starting a next countermeasure when a previous countermeasure is fully exhausted.

2. The method according to claim 1, further comprising averaging the determined emission values over a predefined time period and comparing the averaged determined emission value to the predefined emission limit with the control unit.

3. The method according to one of claim 1, determining the driving state using a driving time, a speed of the vehicle, an acceleration of the vehicle, a power output of the internal combustion engine, and at least one of a $CO_2$ emission or a $NO_x$ emission of the internal combustion engine.

4. The method according to claim 1, wherein one of the at least one countermeasures comprises controlling, by the control unit, the internal combustion engine with the control unit such that an air-fuel ratio of an air-fuel mixture fed to the internal combustion is varied in order to reduce the determined emission values.

5. The method according to claim 1, wherein one of the at least one countermeasures comprises controlling the internal combustion engine with the control unit such that an overlapping period of the intake valve and the exhaust valve of the internal combustion are varied for reducing the determined emission values.

6. The method according to claim 1, wherein one of the at least one countermeasures comprises varying a volume of the combustion air fed to the internal combustion engine using at least one control valve such that the emission values are reduced, wherein the control unit is configured to control the at least one control valve.

7. The method according to claim 1, wherein determining the driving state of the vehicle further comprises accounting for a current location of the vehicle, wherein at least one of the predefined emission limits varies depending upon the location of the vehicle.

8. The method according to claim 1, wherein the emission limits correspond to a regulated emission standard.

9. A non-transitory machined readable medium comprising a computer program product having a program code stored thereon, which when executed on a processor is configured to out the method according to claim 1.

10. A control unit comprising a non-transitory machine readable medium according to claim 9 and a processor configured to execute the program code.

11. A system for controlling at least one of an internal combustion engine and an exhaust gas aftertreatment device comprising:
    driving state detectors configured to determine the driving state of the vehicle and generate corresponding driving state signals; and
    a control unit having a computer model relating the emission values of the exhaust gases emitted by the internal combustion engine based on the driving state signals with consideration of predefined boundary conditions, the control unit configured to:

determine an emission value for each of a plurality of exhaust gases emitted by the internal combustion engine based on the driving state signals and the computer model;

compare the determined emission value with a predefined emission limit corresponding to a respective one of the plurality of exhaust gases; and activate at least one countermeasure assigned to a respective exhaust gas component to control at least one of the internal combustion engine and the exhaust gas aftertreatment device when the determined emission values exceed the predefined emission limits for the respective exhaust gas component such that the determined emission values are reduced until they lie below the predefined emission limits wherein when more than one of the plurality of exhaust gas components exceed their respective predefined emission limits, the control unit is further configured to stagger countermeasures assigned to the plurality of exhaust gas components by starting a next countermeasure when a previous countermeasure is fully exhausted.

12. A vehicle comprising an internal combustion engine, an exhaust gas aftertreatment device and a system according to claim 11.

* * * * *